United States Patent [19]

Schröder et al.

[11] Patent Number: 4,545,569
[45] Date of Patent: Oct. 8, 1985

[54] APPARATUS FOR POSITIONING, CONNECTING AND HANDLING COMPONENTS

[75] Inventors: Günter Schröder, Wetter; Joachim Kiehne, Herborn, both of Fed. Rep. of Germany

[73] Assignee: Deutsche Gesellschaft fur Wiederaufarbeitung von Kernbrennstoffen mbH, Hanover, Fed. Rep. of Germany

[21] Appl. No.: 421,715

[22] Filed: Sep. 22, 1982

[30] Foreign Application Priority Data

Sep. 28, 1981 [DE]  Fed. Rep. of Germany ....... 3138483

[51] Int. Cl.[4] .................... B25J 11/00; G21C 19/32
[52] U.S. Cl. ........................................ 269/43; 269/37; 414/736; 414/745; 901/38; 901/39; 901/42
[58] Field of Search ............... 269/37, 43, 45; 414/736, 732, 745, 747, 433; 901/31, 38, 39, 42

[56] References Cited

U.S. PATENT DOCUMENTS

| | | | |
|---|---|---|---|
| 3,566,505 | 3/1971 | Martin | 269/37 X |
| 3,566,507 | 3/1971 | Jacobsen | 269/45 X |
| 3,901,497 | 8/1975 | Dearman | 269/37 |
| 4,176,269 | 11/1979 | Merrick et al. | 269/43 X |

*Primary Examiner*—Terrance L. Siemens
*Attorney, Agent, or Firm*—Allegretti, Newitt, Witcoff & McAndrews, Ltd.

[57] ABSTRACT

Apparatus is described for remotely positioning, connecting, and generally handling components in a hot cell of a reprocessing plant for spent nuclear fuels. The apparatus includes a housing mounting a first stationary clamp for holding one end of a pipe and a second movable clamp for holding the end of a second pipe to be welded to the first. By adjusting the movable clamp, the pipe therein can be aligned with the pipe in the stationary clamp. The movable clamp can be moved longitudinally to press the pipe ends together, upwardly to compensate for pipe out of round, and can be tilted where pipes are to be joined at an angle. The adjustment permits accurate alignment of the parts. A tool support is rotatably mounted on said stationary clamp to permit welding or other processing through 360°.

13 Claims, 5 Drawing Figures

APPARATUS FOR POSITIONING, CONNECTING AND HANDLING COMPONENTS

This invention relates to apparatus for positioning, connecting and generally handling components, more particularly components in the form of tubes and rods, and is particularly concerned with such apparatus for use in a hot cell of a reprocessing plant for spent nuclear fuels.

Repair, assembly and disassembly work on apparatus, equipment and components, or the general handling of components in rooms or chambers subjected to radioactive radiation, so-called hot cells, more particularly in reprocessing plants for spent nuclear fuels, has hitherto required a considerable outlay in running expenses. The hot cells have had to be first of all decontaminated before they can be entered by the persons who are to carry out the necessary work, and extensive and costly safety measures have to be taken.

It is an object of the present invention to develop an apparatus for positioning, connecting and handling components, including treatment apparatus, equipment and the like, in such a way that, with the help of the apparatus, it is possible to dispense with complicated decontamination and it is also possible to carry out the work more quickly, more simply and more safely.

According to the present invention there is provided apparatus for positioning, connecting and handling components, wherein the apparatus comprises a housing mounting first holder means for accommodating a first component, second holder means for accommodating a second component, an aligning device for aligning the first and second components and operatively connected with at least one of the holder means, and tool holder means associated with at least one of the first and second holder means.

The present apparatus affords substantial technical and economic advantages. The present apparatus allows work to be performed more safely in the hot cell and permits improvement in the quality of work achieved. A substantial saving in costs is achieved by the improved availability and savings in personnel and material.

In order to enable the invention to be more readily understood, reference will now be made to the accompanying drawings, which illustrate diagrammatically and by way of example an embodiment thereof, and in which.

Figure 1:
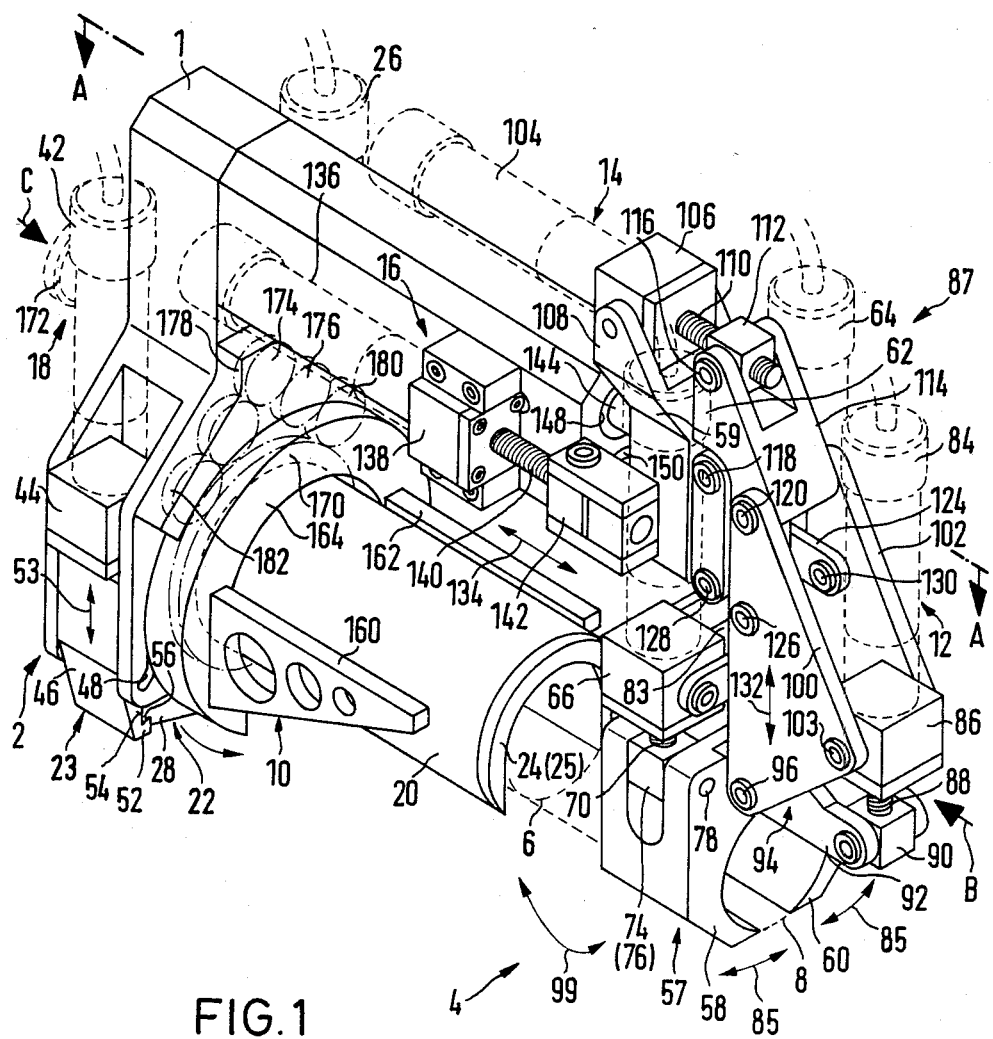
FIG. 1 is a perspective view of apparatus for positioning, connecting and handling components in a hot cell.

Referring now to the drawings, the apparatus there shown comprises a plurality of inter-cooperating units arranged in a housing 1, namely holders 2 and 4 for accommodating components 6 and 8 which are to be handled or connected, a tool holder 10 for a particular tool to be inserted, a tilting device 12 a lifting device 14 and a longitudinal shifting device 16 for the holder 4, and also a rotary device 18 for the tool holder 10.

The holder 2 serves for receiving one component 6, and the holder 4 serves for receiving and for aligning the other component 8 relative to the component 6.

The holder 2 (cf. especially FIGS. 1 and 2) comprises a clamping device 22 with a preferably downwardly open, longitudinally situated, cylindrical supporting sleeve 20, by means of which the holder is placed for example on the component 6 which is arranged in a stationary manner in the room or chamber, and a locking means 23 for locking the securely clamped component. The holder is clamped fast on the component 6 by the clamping device 22. The supporting sleeve 20 comprises at the two ends inwardly projecting spacer rings or spacer ring segments 24 and 25 and is secured in the housing 1, for example releasably, by being screwed therein.

Figure 5:
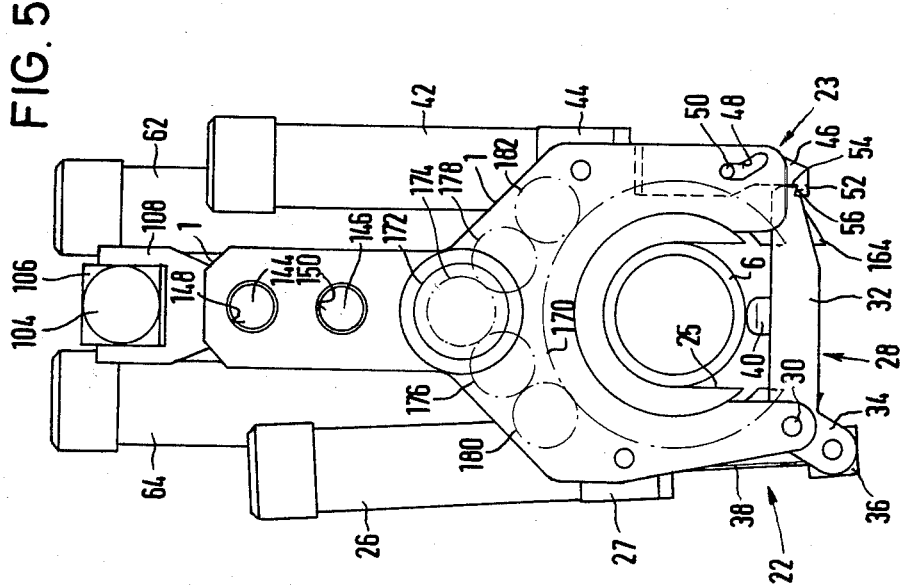
FIG. 5 is a view in the direction of the arrow C in FIG. 1.
Figure 4:
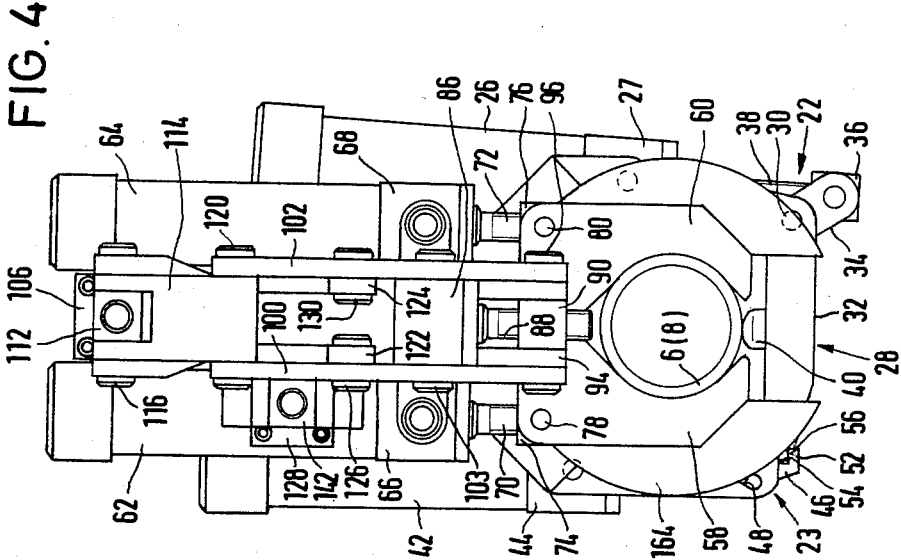
FIG. 4 is a view in the direction of the arrow B in FIG. 1.

The clamping device 22 comprises a clamping motor 26 which is situated in a bearing block 27 arranged in the housing 1, and a two-armed clamping lever 28. The clamping lever 28 is mounted in the housing 1 so as to be pivotable about an axis 30. Its longer lever arm 32 is pivotable from below towards the component 6 situated in the supporting sleeve 20, and a nut 36 is arranged rotatably on its shorter lever arm 34. A screwthreaded spindle 38 actuatable by the clamping motor 26 is rotatably arranged in the nut 36. By operating the clamping motor the two-armed clamping lever 28 can be pivoted for clamping the supporting sleeve 20 securely to the component 6. To obtain punctiform bearing contact or abutment, the longer lever arm 32 can be provided with a clamping dog or nose 40 (cf. FIGS. 2, 4 and 5).

After the pivoting of the clamping lever 28 into the clamping position, the longer lever arm 32 can be locked by the locking means 23. The locking means 23 comprises for this purpose a locking motor 42 which is arranged in a bearing block 44 secured on the housing 1. The locking motor, via a screw drive (not shown), operates a locking jaw 46 which is formed with a cam slot 48 by which the locking jaw is guided on a guide pin 50 secured on the housing. The locking jaw 46 terminates in a locking claw 52 which upon operation of the locking jaw, i.e. here on upward movement (cf. double arrow 53) of the locking jaw, engages in or under the end 54 of the longer lever arm 32; in the illustrated constructional form the locking claw 52 engages in a recess 56—cf. FIGS. 1, 4 and 5.

Figure 2:
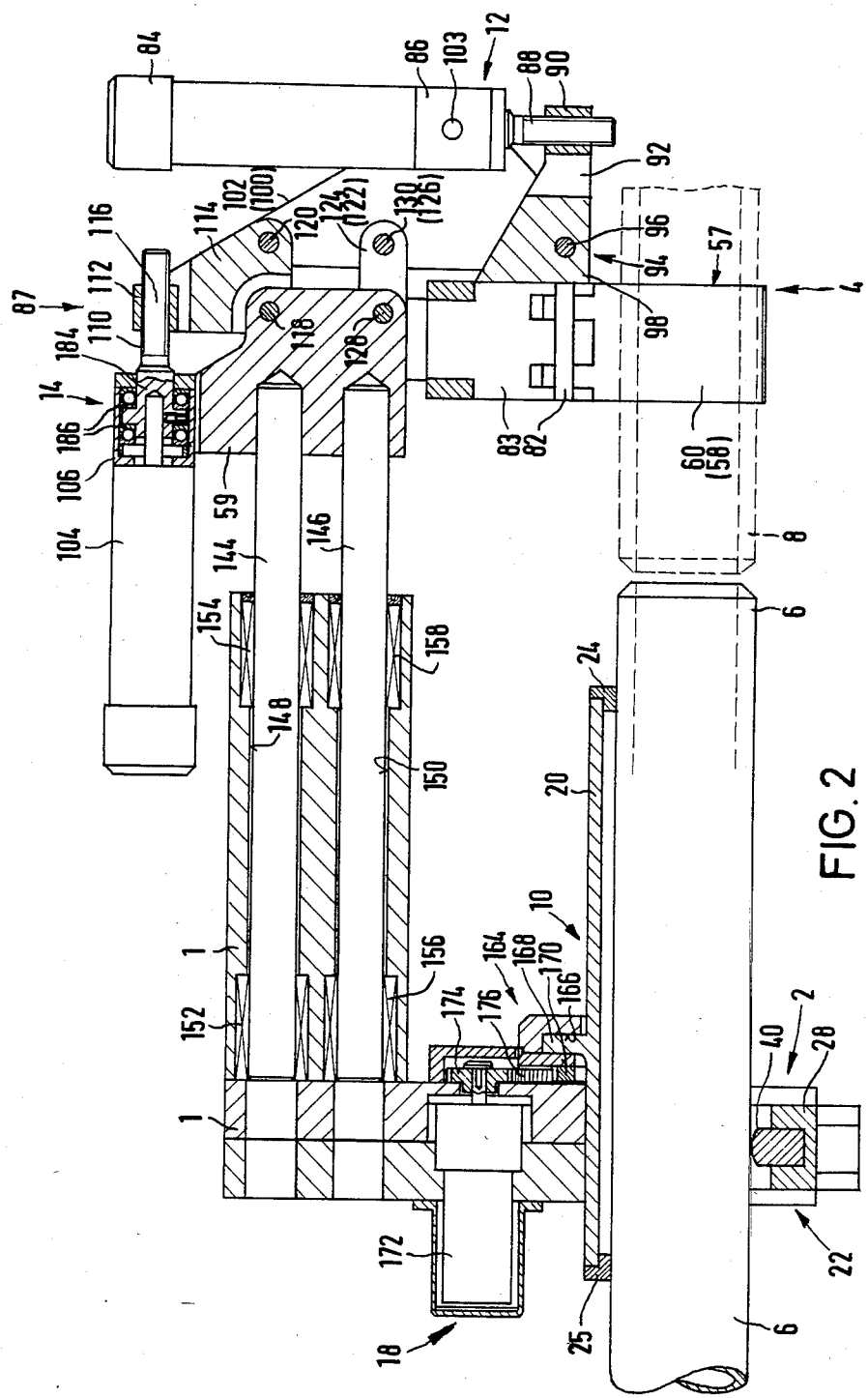
FIG. 2 is a section through the apparatus along the line A—A in FIG. 1.

The holder 4 (cf. more particularly FIGS. 1, 2 and 4) comprises a clamping device 57 arranged on a holder element 59 and having two clamping jaws 58 and 60, between which the component 8 is held for alignment with the stationary component 6. The clamping jaws are actuatable individually by means of laterally arranged clamping motors 62 and 64 which are arranged in bearing blocks 66 and 68 and are arranged to drive screwthreaded spindles 70 and 72 which are arranged rotatably in nuts 74 and 76 mounted rotatably about pins 78 and 80 in the clamping jaws 58 and 60 respectively. The clamping jaws 58 and 60 are arranged in a clamping jaw bearing block 83 so as to be pivotable about a common pivot pin 82 (FIG. 2). The possibility of actuating the clamping jaws separately allows better aligning of the component 8 with the component 6. Moving the nuts 74 and 76 downwards pivots the clamping jaws toward one another (cf. double arrows 85 in FIG. 1).

For exactly aligning the component 8 to be connected to the component 6, an aligning device 87 is provided and comprises the tilting device 12, the lifting device 14 and the longitudinal shifting device 16, and serves for tilting, lifting and lowering, and shifting longitudinally the holder 4.

The tilting device 12 comprises a tilting motor 84 (omitted from FIG. 4) arranged at the end and situated in a bearing block 86, the motor 84 serving to drive a screwthreaded spindle 88 which is mounted rotatably in a nut 90. The nut is arranged rotatably in a fork-line lever arm 92 of a two-armed rocking lever 94, which is pivotable about a pivot pin 96 and the other lever arm 98 of which is connected securely to the clamping jaw bearing block 83. When the nut 90 is moved downwards, the clamping jaws pivot in the direction of the holder 2 and, when it is moved upwards, in the opposite direction—see double arrow 99 in FIG. 1.

The bearing block 86 is arranged between two parallel plates 100 and 102 of triangular construction for pivoting movement about a pin 103. The parallel plates 100 and 102 are liftable and lowerable jointly by means of the lifting device 14 and the pivot pin 96 is mounted in the parallel plates.

The lifting device 14 comprises a lifting motor 104 which is situated above the housing 1 and which is secured in a bearing block 106 rotatably mounted in a fork-like support element 108 of the holder element 59. The lifting motor 104 is arranged to actuate a screwthreaded spindle 110 which is arranged rotatably in a nut 112. The nut 112 in its turn is situated in a triangular lifting element 114 which acts as a right-angled two-armed lever and which comprises three triangularly arranged pivot pins 116, 118 and 120, the nut 112 being pivotably mounted on the pin 116 and the pin 120 connecting the parallel plates 100 and 102 to the lifting element 114. The pins 120 and 103 and the pivot pin 96 of the parallel plates are located at the corners of a triangle and the lifting element 114 is connected to the holder element 59 for rotational movement about the pivot pin 118.

The two parallel plates 100 and 102 are articulated to the holder element 59 by means of two parallel levers 122 and 124. The pivot pins 126 and 128 in the parallel plate 100 and the holder element 59 are associated with the lever 122, and the pivot pins 130 and 128 in the parallel plate 102 and the holder element 59 are associated with the lever 124. The pins 118, 120, 126, 128, and 118, 120, 130, 128 respectively form the apices of a parallelogram.

Owing to this construction, when the lifting motor 104 is actuated, a pivoting movement of the lifting element 114 occurs about the pin 118 and thus a lifting or lowering of the parallel plates 100 and 102 (cf. double arrow 132) occurs, and thus of the clamping jaws 58 and 60, but the lifting and lowering movement occurs in a slightly inclined manner owing to rotation about the pins 118 and 128. The slight longitudinal displacement of the holder and clamping jaws 58 and 60 which results can be compensated for by the use of the longitudinal shifting device 16 which, for exact positioning of the component 8, allows longitudinal displacement of the holder 4 and the clamping jaws 58 and 60 (cf. double arrow 134).

Figure 3:
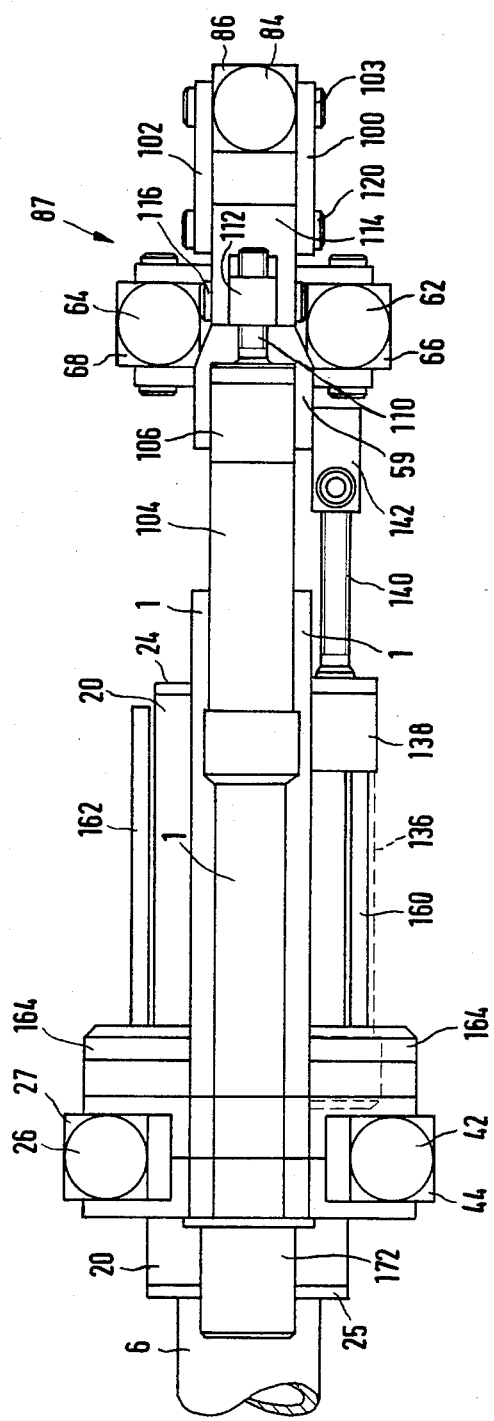
FIG. 3 is a plan view of the apparatus shown in FIG. 1.

The longitudinal shifting apparatus 16 (cf. FIGS. 1, 2 and 3) has a shifting motor 136 which is arranged in a bearing block 138 fast with the housing and which drives a screwthreaded spindle 140 which is rotatably mounted in a nut 142 secured on the holder element 59. Two superjacent pivot pins 144 and 146 which are arranged so as to be displaceable in two housing bores 148 and 150, are secured in the holder element 59. To reduce friction, two spaced bushings 152, 154 and 156, 158 are arranged in the housing bores 148, 150 and guide the pins 144 and 146.

As already mentioned hereinbefore, the tool holder 10 is used for holding the particular tool with which the two components 6 and 8, aligned with one another, are to be connected to one another, or with which any other work is to be carried out on the components. The tool can be e.g. a welding apparatus, a soldering apparatus, a screwing apparatus, a wrapping apparatus, a rivetting apparatus, a separating apparatus, a releasing apparatus or the like.

The tool holder 10 (cf. more particularly FIGS. 1, 2, 3) comprises two support arms 160, 162 which are connected securely to a ring-shaped or ring segment shaped tool support 164 and extend in the direction of the supporting sleeve 20. The tool support 164 has a ring groove or ring segment groove 166 which is arranged on a ring flange or ring segment flange 168 constructed on the supporting sleeve 20. A toothed ring or toothed ring segment 170 is flanged on to the rear end of the tool support 164. Through the agency of this toothed ring segment 170, the tool support 164 is rotatable together with the support arms 160, 162 on the ring flange 168 or ring segment flange 168. For this purpose the rotary device 18 is provided and comprises a rotary motor 172 which is secured on the rear part of the housing 1 and which is arranged to drive a pinion 174 meshing with two intermediate gearwheels 176 and 178 which each engage with a drive gearwheel 180 and 182 respectively, the latter being spaced relative to one another and meshing with the toothed ring segment 170 and serving to rotate this and therefore the tool support 164. The arrangement of the gearwheels 176, 178, 180 and 182 and the length of the toothed ring segment 170 are so chosen that at least one drive gearwheel is always engaged with the toothed ring segment, and thus 360° rotation of the tool support 164 is guaranteed.

So that the holder apparatus can also be used for components which differ greatly dimensionally, the supporting sleeve 20 is preferably releasably secured in the housing, as already mentioned above, so that interchanging with supporting sleeves of different dimensions is possible.

As already described, the motors used in the present apparatus are arranged in bearing blocks. A possible constructional form of the arrangement motor/bearing block is shown in detail in FIG. 2 for the lifting motor 104. A guide pin 184 of the screw-threaded spindle 110 is arranged rotatably in the bearing block 106, in ball bearings 186. The guide pin is connected with the drive output side of the lifting motor 104, for example by means of a mitre gear flange-connected already to the motor.

The apparatus described hereinbefore is suitable, for example, for accommodating a welding apparatus and for welding, for example, two tubular components 6 and 8. The apparatus is readily remote-controllable; it can readily be held and handled by a robot or a power-operated manipulator, for which purpose it is simply necessary to arrange a suitable handle above on the housing 1. Thus the apparatus described hereinbefore is suitable more particularly for assembly, disassembly, repair and maintenance work in so-called "hot cells" of reprocessing plants, without the cells having to be entered by personnel.

We claim:

1. Apparatus for positioning, connecting and handling first and second elongated components comprising a housing, first clamping means fixed to said housing for holding said first component stationary, said first clamping means comprising a downwardly open longitudinally-disposed supporting sleeve for accommodating the first component and a clamping lever pivotable towards the supporting sleeve, a locking device for locking the clamping lever in its pivoting position, a power-actuatable locking jaw with a locking claw which engages the end of said clamping lever, said locking jaw being formed with a cam slot for control of movement of said locking jaw and a guide pin fast with the housing engaging in said slot, second clamping means for holding said second component, adjustably mounted on said housing for movement with respect to said clamping means, means mounted on said housing for moving said second clamping means to axially align said second component with said first component, to shift it longitudinally toward and away from said first component, to tilt it with respect to the axis of said first component, and to lift it out of alignment with said first component but with its axis parallel to the axis of said first component.

2. Apparatus for positioning, connecting and handling first and second elongated components comprising a housing, first clamping means fixed to said housing for holding said first component stationary, second clamping means for holding said second component, adjustably mounted on said housing for movement with respect to said first clamping means means mounted on said housing for moving said second clamping means to axially align said second component with said first component, to shift it longitudinally toward and away from said first component, to tilt it with respect to the axis of said first component, and to lift it out of alignment with said first component, but with its axis parallel to said first component, said longitudinally-shifting means, said tilting means and said lifting means being operatively connected with said second clamping means though a holder element, a clamping jaw bearing block mounted on said second clamping means, said tilting means comprising a two-armed power-actuatable rocking lever connected securely to said clamping jaw bearing block, and pivotable about pivot pins disposed in said holder element.

3. The apparatus of claim 2 in which said lifting means is connected to said holder element by pivot pins, which pins, with the pivot pins of said rocking lever, form the apices of parallelograms.

4. The apparatus of claim 2 wherein said tilting means is mounted on spaced parallel plates.

5. Apparatus for positioning, connecting and handling first and second elongated components comprising a housing, first clamping means fixed to said housing for holding said first component stationary, second clamping means for holding said second component, adjustably mounted on said housing for movement with respect to said first clamping means means mounted on said housing for moving said second clamping means to axially align said second component with said first component, to shift it longitudinally toward and away from said first component, to tilt it with respect to the axis of said first component, and to lift it out of alignment with said first component, but with its axis parallel to said first component, and a tool holder rotatably mounted on said first clamping means, said tool holder comprising a tool support with an annular groove movably arranged on a toothed-ring flange mounted on a supporting sleeve of said first clamping means, said ring flange being engaged with driving gears, said driving gears comrising a pinion, and two spaced intermediate gear wheels, and a rotary motor connected to said pinion.

6. Apparatus for positioning, connecting and handling first and second elongated components comprising an elongated housing, a first clamping means suspended from one end of said housing for holding said first component stationary, a holder element mounted for axial movement in two directions on the other end of said housing, linkage means pivotally-mounted on said holder element, second clamping means for holding said second component, said second clamping means being pivotally-mounted on and suspended from said linkage means in substantial alignment with said first clamping means, actuating means mounted on said holder element and connecting to said linkage means to tilt said second component with respect to the axis of said first component, and to parallely displace said second component with respect to said first component.

7. The apparatus of claim 6 wherein said first clamping means comprises a component-supporting sleeve having at each end an inwardly-projecting spacer ring in the form of an annular flange as a rest for said first component.

8. The apparatus of claim 7 in which said first clamping means includes a clamping lever having an arm which pivots toward said supporting sleeve and is power-operable.

9. The apparatus of claim 8 in which said supporting sleeve carries a toothed-ring flange, which flange meshes with a power-actuated pinion to rotate said sleeve.

10. The apparatus of claim 6 wherein said second clamping means has a pair of power-actuated jaws pivotable about a common pivot pin.

11. The apparatus of claim 6 wherein said tilting means comprises a two-armed, power-actuated rocking lever as part of said linkage means, and a bearing block pivotally-mounted between said levers.

12. The apparatus of claim 6 wherein said displacing means comprises as part of said linkage means a power-actuated, pivotally-mounted lifting element having two lever arms, one of which is connected to a motor, and the other of which is connected to said second clamping means.

13. The apparatus of claim 6 in which said holder element slides on two pins which project from said other end of the housing and is connected to a motor mounted on said housing.

* * * * *